(No Model.)
J. K. GETTY.
BICYCLE SUPPORT.
No. 546,612. Patented Sept. 17, 1895.
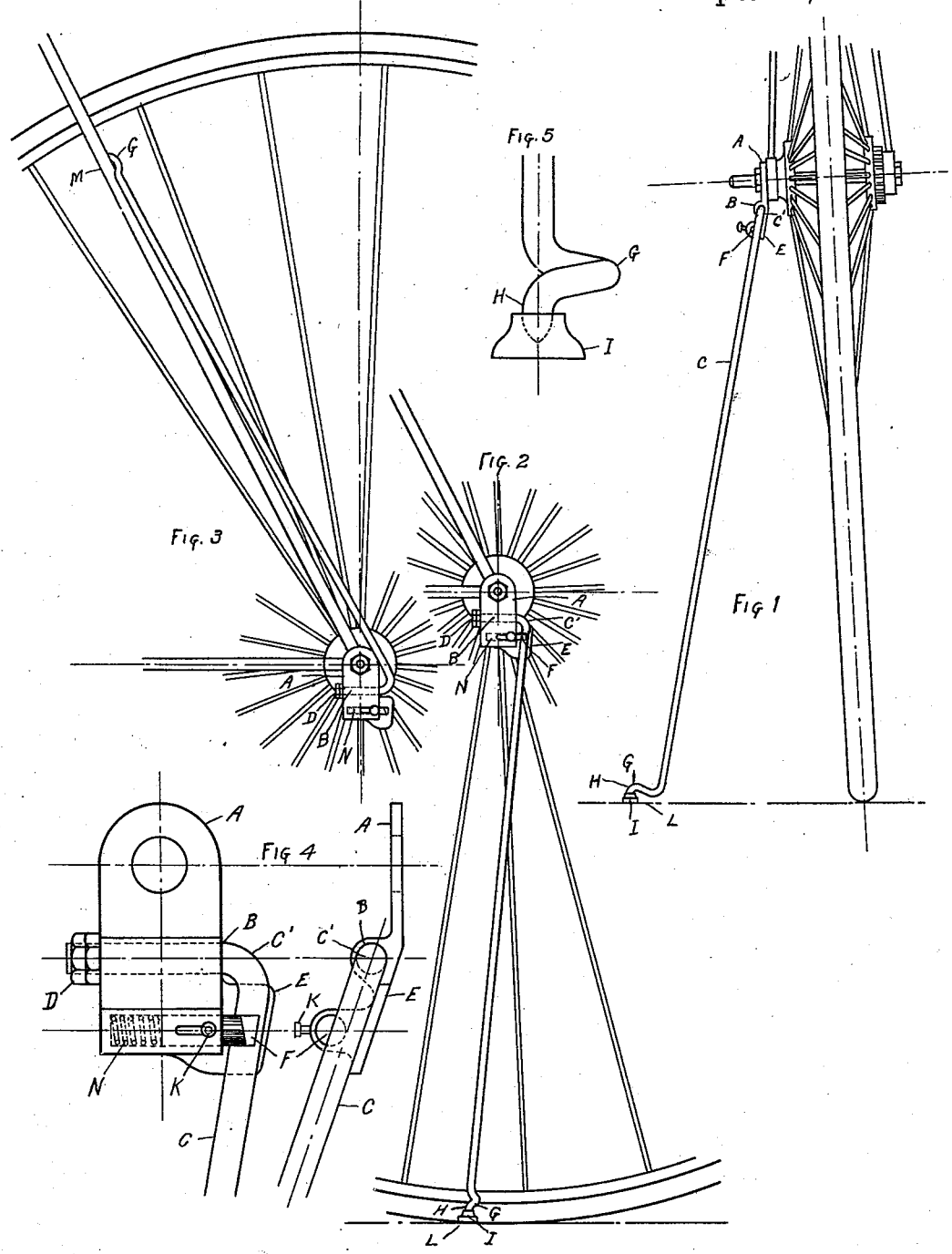
WITNESS:
E. G. Herndon
A. Simson
INVENTOR
John K Getty
BY J. D. Brown
ATTORNEY.

UNITED STATES PATENT OFFICE.

JOHN K. GETTY, OF CAMDEN, NEW JERSEY.

BICYCLE-SUPPORT.

SPECIFICATION forming part of Letters Patent No. 546,612, dated September 17, 1895.

Application filed May 28, 1894. Serial No. 512,774. (No model.)

*To all whom it may concern:*

Be it known that I, JOHN K. GETTY, a citizen of the United States, residing in the city of Camden, in the county of Camden and State of New Jersey, have invented a new and useful Improvement in Bicycle-Supports, of which the following is a specification.

My invention relates to devices adapted to furnish a support to bicycles when not in use, which shall be so attached to the machine as to be carried with it when it is in use as a vehicle for riding, and to be handily and effectively adjusted to support the machine when not being ridden upon, so that it may quickly be placed in a standing position at any place, as on the highway, where the rider may wish to stop temporarily without having to resort to any object apart from the bicycle for a place to rest it against or in shop, show, or warehouse room or the house of the owner. Certain characteristics seem essential to such a support—namely, that it shall be as light as is consistent with needed strength; that it shall be an adornment rather than unsightly; that it shall be so located and secured when not in use to support the bicycle as not to become loosened and get in the rider's way; that it shall be firmly held at the angle of its action as a support, so as not to spread away from the tread of the wheel nor draw toward it and increase or diminish the length of the base on which the machine stands and thus endanger its falling; that its foot shall be adapted to give resistance enough under the pressure of the weight of the bicycle, which must bear on it when the machine is resting on the support, so as not to sink in the soft earth, and the foot must have such adhesive nature as not to slip on the smoothest floor or pavement, and such elastic nature as not to injure carpets, and that its position when not in use as a support shall not be thrown in so near the tread of the wheel at the bottom or in any other position as to be in danger of being pressed into entanglement with the spokes of the rotating bicycle-wheel.

That it may be clearly seen how in my invention I reach these desirable characteristics, and have invented a new and useful improvement in bicycle-supports, and that it may be made with facility, I accompany this specification with drawings which form a part of it, in which—

Figure 1 is a rear elevation of a lower portion of a safety-bicycle wheel and frame, showing my device in operation as a rest. Fig. 2 is a side elevation of the same. Fig. 3 is a side elevation of an upper portion of a bicycle wheel and frame, showing the position of my device when not in use as a support. Fig. 4 is a front and end view of the mechanism of my device, by which it is secured to the bicycle, and the rod constituting the supporting member of the device is pivoted for its necessary movements in service and fastened securely to its position when in use as a stand; and Fig. 5 is a perspective view of the "foot" of the stand of about its actual size, and the designatory signs in each figure represent the same parts in all the others.

In my device is a bracket A, which is adapted to be secured firmly to the bicycle, preferably at the end of the axis of the wheel, by screwing the usual step down upon it or by a proper nut provided for the purpose. In this stand there is provision made at B by a cylindrical hole extending through it or some equivalent recess to properly pivot the stiff rod C, which forms the efficient member of the support to it, so that the rod may be given the various movements that are needed in its operation. This stiff rod C is bent at the end C', where it is attached to the stand, at such an angle as is needed to adapt it to assume the position L opposite the tread of the wheel where it does its duty as a support, and also at the upper position M where it securely attaches to a branch of the frame of the bicycle when it is not wanted as a support, and it has on this angular pivotal end a pair of clamp-nuts D, by which it is secured in its recess in the stand, and a requisite amount of friction is given it in its pivotal bearing or recess to prevent the rod from falling out of its upper position by being loosened by any jar of the bicycle in riding. The bracket A also carries an ear or stop E, by which the rod C is securely held from coming nearer the tread of the wheel than the angle needed, so that when the bicycle is slightly inclined toward the support when it is in position to support the machine, the center of gravity shall be thrown to the proper point between the wheel and the support, and the machine shall stand securely held up by the support. The bracket A is also provided with a self-acting bolt F situated in a proper recess in the stand. This bolt has its outer end formed to a plane inclined to its longitudinal axis, and situated so that when the rod C is rotated on its pivotal bearing and brought down toward the tread of the wheel it impinges on the end of the bolt and forces the bolt back till the rod C comes in contact with the stop E, when the elastic spring N, which is confined in contact with and behind the bolt, shoots it out by the rod to a distance sufficient to confine the rod between the bolt F and the stop E, thus holding the rod firmly in its right position for supporting the machine. The bolt has also a knob K attached to it by which it is pressed back to release the rod from its confinement between the bolt and stop. The rod C is bent at its lower end G so as to form about a half-circle, having, preferably, a sufficient spiral inclination to the longitudinal axis of the rod, so that when it and the bicycle are in the normal position for the rod to be acting as a support the bent foot G shall sit approximately level with the floor, earth, or pavement. This bent foot serves the purpose of affording resistance to the tendency of the rest to sink into soft earth under the pressure of the machine, which it will always do, and the machine will soon tip over and fall if the rest-rod only presents the area of a transverse section of the rod to stand on. The semicircular foot also serves to clasp the branch of the frame of the bicycle at M or such part of the machine as may be chosen for the purpose and retains the support in place while the bicycle is ridden. The extreme end of the bent foot bears a teat H, which is bent from it in the direction of the general line of the body of the stiff rod, which teat is adapted to bear the elastic foot I, to be made of some elastic material, presumably partly-vulcanized rubber, which will have enough capillary adhesion to insure that the foot will not slip on the smooth floors of a salesroom, and which will secure the carpets of a living-room in the home from injury.

Having thus described my invention, it is manifest that when this device is properly attached to a bicycle and is in the position represented in Fig. 3, if the semicircular foot be detached from its contact with the arm of the bicycle-frame which holds the rod when not in use as a support to the machine and this rod is swung on its axis or pivot, the rod in descending toward the tread of the wheel will force back the bolt until its downward movement is arrested by the stop, when the bolt will spring out across the rod and lock it securely in its position as a support, when, the bicycle being caused to incline to that side till the foot of the rod touches the ground, floor, or pavement, (see Fig. 1,) the bicycle will then be safely supported by it in a practically-standing position. When for any reason the bicycle is not wanted to stand supported by this rest, the bolt is pressed back by the knob attached to it and the rod is released, then by a simple upward swing of the rod it is returned to and secured in its position at M, Fig. 3.

Having thus fully described my invention, what I claim as new and useful, and desire to secure by Letters Patent, is—

1. The combination in a bicycle support, of a bracket; having a hole or opening by which it is securely fastened to the bicycle at a proper place, preferably the axle, by a step, nut, or adequate means, and having a proper pivotal bearing or recess fitted to receive the stiff rod of the support, and an ear, or stop, to adjust the rod in its right relation to the tread of the wheel, and having also, in a recess, a spring bolt fitted automatically to lock the stiff rod securely between itself and the stop, against danger of its being unfastened accidentally by moving the bicycle either backward, forward, or side wise; with the stiff rod, which is bent at the upper end so as properly to fit and operate in the pivotal recess in the bracket, and also bent at the lower end, so as to form a foot, of the form of at least a semi-circle, at nearly right angles to the rod, so as to accomplish the purpose, of presenting sufficient resistance against sinking into the ground to assure that the bicycle will stand securely, all substantially as and for the purposes set forth.

2. The combination in a bicycle support, of a bracket; having a hole or opening by which it is securely fastened to the bicycle at a proper place, preferably the axle, by a step, nut, or adequate means, and having a proper pivotal bearing or recess fitted to receive the stiff rod of the support, and an ear, or stop, to adjust the rod in its right relation to the tread of the wheel, and having also, in a recess, a spring bolt fitted automatically to lock the stiff rod securely between itself and the stop, against danger of its being unfastened accidentally by moving the bicycle either backward, forward, or side wise, substantially as described.

JOHN K. GETTY.

Witnesses:
A. SEEMAN,
JAS. WILBUR BROWN.